(12) United States Patent
Chen et al.

(10) Patent No.: US 10,763,466 B2
(45) Date of Patent: Sep. 1, 2020

(54) TOP CAP ASSEMBLY OF A SECONDARY BATTERY, AND SECONDARY BATTERY

(71) Applicant: Contemporary Amperex Technology Co., Limited, Ningde, Fujian (CN)

(72) Inventors: Baisong Chen, Ningde (CN); Quankun Li, Ningde (CN); Peng Wang, Ningde (CN); Chengyou Xing, Ningde (CN); Yulian Zheng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 134 days.

(21) Appl. No.: 16/033,201

(22) Filed: Jul. 12, 2018

(65) Prior Publication Data
US 2019/0280257 A1 Sep. 12, 2019

(30) Foreign Application Priority Data

Mar. 9, 2018 (CN) .......................... 2018 1 0195161

(51) Int. Cl.
*H01M 2/30* (2006.01)
*H01M 2/06* (2006.01)
*H01M 2/04* (2006.01)

(52) U.S. Cl.
CPC ............ *H01M 2/06* (2013.01); *H01M 2/04* (2013.01); *H01M 2/0469* (2013.01); *H01M 2/30* (2013.01)

(58) Field of Classification Search
CPC .................................. H01M 2/30; H01M 2/06
See application file for complete search history.

(56) References Cited

U.S. PATENT DOCUMENTS

2011/0311863 A1* 12/2011 Byun .................. H01M 2/06
429/181

FOREIGN PATENT DOCUMENTS

| CN | 101826603 A | 9/2010 |
|---|---|---|
| JP | 2013-161692 A | 8/2013 |

OTHER PUBLICATIONS

Extended European Search Report for European Application No. 18184043.0, dated Dec. 6, 2018, 6pages.

\* cited by examiner

*Primary Examiner* — Olatunji A Godo
(74) *Attorney, Agent, or Firm* — Law Offices of Liaoteng Wang

(57) ABSTRACT

A top cap assembly of a secondary battery and second battery is provided. The top cap assembly may comprise: a top cap plate comprising an electrode extraction hole; an electrode terminal comprising a terminal plate, the terminal plate may be located on a side of the top cap plate and cover the electrode extraction hole; a first fixing component, the first fixing component may at least partially surround the terminal plate to fix the electrode terminal to the first fixing component; and a second fixing component comprising a main body and a first connection portion connected to the main body and extends away from the terminal plate, the main body may be fixedly connected to the first fixing component, and the first connection portion may be fixedly connected to the top cap plate.

17 Claims, 8 Drawing Sheets

TOP CAP ASSEMBLY OF A SECONDARY BATTERY, AND SECONDARY BATTERY

CROSS-REFERENCE TO RELATED APPLICATION

This application is based on and claims priority to Chinese Patent Application No. 201810195161.9 filed on Mar. 9, 2018, which is incorporated herein by reference in its entirety.

TECHNICAL FIELD

The present application relates to the field of energy storage devices, and more particularly to a top cap assembly of a secondary battery and second battery.

BACKGROUND

New energy vehicles have been widely prompted all over world, but more improvements are required for them to replace fuel vehicles completely. For example, problems such as short driving distance, high cost of battery packs, and reliability of battery packs needs to be further addressed. For the above problems, higher requirements are placed on the core component, i.e., power battery, of electric vehicles, for example, the power battery is required to achieve a higher energy density, a lower cost, etc.

Currently, the power battery generally adopts a square hard case structure, the power battery case includes a case and a top cap assembly, and the power battery case provides a sealed space for accommodating electrode assembly and electrolyte. The electric energy of the electrode assembly is extracted to outside of the sealed space through the electrode terminal of the top cap assembly. In the existing top cap assembly, the top cap plate is a metal plate and is provided with a through-hole, the electrode terminal is divided into a base portion and an extension portion, and the cross-sectional area of the base portion is larger than the aperture of the through-hole. During assembling, the base portion is located under the top cap plate (i.e., inside the case), and after the extension portion passes through the through-hole, the extension portion is fixed using a snap spring or riveting, and the electrode terminal is fixed onto the top cap plate in this manner. Since the base portion is located inside the case, the space utilization inside the case is reduced, thereby reducing the power density of the power battery.

Because the structure of the electrode terminal itself and the assembling procedure are complicated, not only the assembling efficiency of the secondary battery will be affected, but also after the electrode terminal is fixed onto the top cap plate, the electrode terminal and the top cap plate may disconnect due to insufficient fixing strength, which reduces the use reliability of secondary batteries.

Therefore, there is a need for a new top cap assembly of a secondary battery and second battery.

SUMMARY

According to embodiments of the present disclosure, there is provided a top cap assembly of a secondary battery and second battery.

According to one aspect of embodiments of the present disclosure, there is provided a top cap assembly of a secondary battery, comprising: a top cap plate comprising an electrode extraction hole; an electrode terminal comprising a terminal plate, the terminal plate may be located on a side of the top cap plate and cover the electrode extraction hole, and an outer peripheral surface of the terminal plate may protrude outside and exceed an inner wall of the electrode extraction hole; a first fixing component, the first fixing component may at least partially surround the terminal plate to fix the electrode terminal to the first fixing component; and a second fixing component comprising a main body and a first connection portion connected to the main body and extends away from the terminal plate, the main body may be fixedly connected to the first fixing component, and the first connection portion may be fixedly connected to the top cap plate, wherein the electrode terminal may be separated from the second fixing component through the first fixing component.

According to one aspect of embodiments of the present disclosure, the main body may comprise a second connection portion and a transition portion, the transition portion may be located between the first connection portion and the second connection portion, and the second connection portion may be fixedly connected to the first fixing component.

According to one aspect of embodiments of the present disclosure, the electrode terminal may further comprise a first flange protruding from the outer peripheral surface of the terminal plate, and a portion of the first fixing component may be located on a side of the first flange away from the top cap plate and abut against the first flange.

According to one aspect of embodiments of the present disclosure, the second connection portion may extend toward the terminal plate, and a portion of the first fixing component may be located between the second connection portion and the top cap plate.

According to one aspect of embodiments of the present disclosure, the second connection portion may be located on a side of the first flange away from the top cap plate.

According to one aspect of embodiments of the present disclosure, the second connection portion may extend away from the terminal plate, and a portion of the first fixing component may be located between the second connection portion and the top cap plate.

According to one aspect of embodiments of the present disclosure, the first fixing component may be circumferentially provided with an accommodation groove adapted to the shape of the second connection portion, and the second connection portion may protrude into the accommodation groove and fixedly connect to the first fixing component.

According to one aspect of embodiments of the present disclosure, the second connection portion may extend in parallel to the top cap plate, the outer peripheral surface of the first fixing component may be provided with a second flange, and the second connection portion may be located on a side of the second flange away from the top cap plate and abut against the second flange.

According to one aspect of embodiments of the present disclosure, the second connection portion and/or the first connection portion may be a continuous annular structure.

According to one aspect of embodiments of the present disclosure, the top cap assembly may further comprise a seal component arranged between the terminal plate and the top cap plate to seal the electrode extraction hole.

According to one aspect of embodiments of the present disclosure, the terminal plate may comprise a first terminal plate and a second terminal plate connected to the first terminal plate, the first terminal plate may be located on a side of the second terminal plate away from the top cap plate, the second terminal plate may cover the electrode extraction hole, and the material of the first terminal plate and the material of the second terminal plate may have different base metals, the seal component may be located between the second terminal plate and the top cap plate.

According to one aspect of embodiments of the present disclosure, the top cap plate may further comprise a third flange, the third flange may surround the perimeter of the electrode extraction hole and extend toward the terminal plate, and the seal component may be assembled outside of the third flange.

According to one aspect of embodiments of the present disclosure, the top cap plate may further comprise a first sink portion, the first sink portion may surround the perimeter of the electrode extraction hole, the first connection portion may be at least partially accommodated in the first sink portion, and the surface of a side of the first connection portion away from the top cap plate may be flush with the surface of a side of the top cap plate facing the second fixing component, the first connection portion may be welded to the top cap plate.

According to one aspect of embodiments of the present disclosure, the top cap plate may further comprise a second sink portion, the second sink portion may surround the perimeter of the first sink portion, and the surface of a side the first connection portion away from the top cap plate may be flush with the bottom surface of the second sink portion.

According to one aspect of embodiments of the present disclosure, the top cap plate may further comprise a fourth flange, the fourth flange may be annular and surround the perimeter of the electrode extraction hole, to form the first sink portion by the fourth flange.

According to one aspect of embodiments of the present disclosure, the top cap plate may further comprise an annular groove that may surround the perimeter of the first sink portion.

According to another aspect of embodiments of the present disclosure, there is also provided a secondary battery, comprising: a case having an opening; an electrode assembly accommodated in the case; and the above top cap assembly covering the opening, to seal the electrode assembly in the case.

In summary, the top cap assembly of the secondary battery and the terminal assembly in the secondary battery of embodiments of the present disclosure may be provided with the first fixing component and the second fixing component, the first fixing component may be fixedly connected to the terminal plate in the electrode terminal, and the second fixing component may be fixedly connected to the top cap plate and the first fixing component simultaneously, thereby the first fixing component and the terminal plate may be fixed onto the top cap plate. The second fixing component may be used to provide an effective fixing strength for the terminal plate and the first fixing component, so as to avoid disconnection of the terminal plate and the first fixing component from the top cap plate which may cause a leakage of the secondary battery, thereby the structural safety of the secondary battery may be enhanced. In addition, since a fixed structure of the electrode terminal is located inside the case may be omitted, the occupation of the interior space of the secondary battery may be reduced, so as to improve the energy density of the secondary battery and reduce the production cost.

BRIEF DESCRIPTION OF THE DRAWINGS

The present disclosure may be better understood from the following description of specific embodiments of the present disclosure in conjunction with the accompanying drawings, in which.

Other features, purposes, and advantages of the present disclosure will become apparent from the following detailed description of non-limiting embodiments with reference to the drawings in which like or similar reference numerals indicate like or similar features.

ILLUSTRATION FOR REFERENCE NUMERALS

Figure 1:
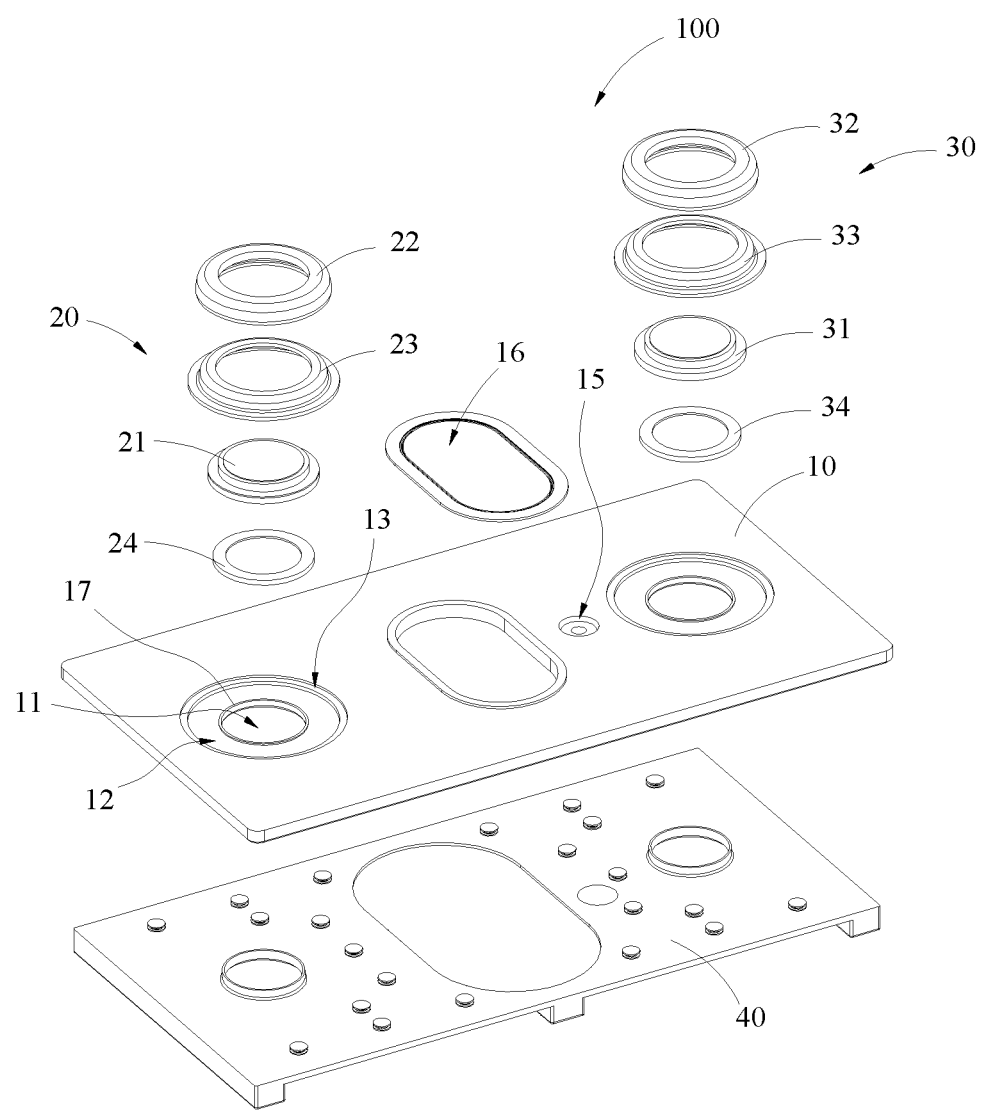
FIG. 1 is a stereoscopic structure diagram of atop cap assembly of a secondary battery according to an embodiment of the present disclosure.

100—a top cap assembly; 101—a top cap assembly; 102—a top cap assembly; 103—a top cap assembly 10—a top cap plate; 11—an electrode extraction hole; 12—a first sink portion; 13—a second sink portion; 14—a third sink portion; 15—an injection hole; 16—a vent assembly; 17—a third flange; 18—a fourth flange; 19—an annular groove;

20—a terminal assembly; 21—a terminal plate; 211—a first flange; 22—a first fixing component; 221—a through-hole; 222—a second flange; 23—a second fixing component; 231—a transition portion; 232—a first connection portion; 233—a second connection portion; 24—a seal component;

30—a terminal assembly; 31—a terminal plate; 311—a first terminal plate; 312—a second terminal plate; 32—a first fixing component; 33—a second fixing component; 34—a seal component;

40—a lower insulation component.

DETAILED DESCRIPTION

The features and exemplary embodiments of various aspects of the present disclosure will be described in detail below. In the following detailed description, numerous specific details are set forth in order to provide a thorough understanding of the present disclosure. However, it will be apparent to those skilled in the art that the present disclosure may be practiced without some of these specific details. The following description of the embodiments is merely intended to provide a better understanding of the present disclosure by illustrating examples of the present disclosure. In the drawings and the following description, at least some of the well-known structures and techniques are not shown in order to avoid unnecessarily obscuring the present disclosure; and, for clarity, the dimensions of the partial structures may be exaggerated. The same reference numerals indicate like or similar structures in the drawings, detailed description of which may be omitted. Additionally, the features, structures, or characteristics described hereinafter may be combined in any suitable manner in one or more embodiments.

The direction appearing in the following description are all directions shown in the drawings, and do not limit the specific structure of the top cap assembly and the second battery of the present disclosure. In the description of the present disclosure, it should be further noted that, unless otherwise specified and limited, the terms "mount", "engage" and "connect" should be understood in a broad sense, for example, it may be a fixed connection, a detachable connection, or an integrated connection, either directly or indirectly. Those of ordinary skill in the art can understand the specific meanings of the above terms in the present disclosure according to the specific situation.

The top cap assembly of a secondary battery provided in embodiments of the present disclosure may be used to connected at the opening of the case of the secondary battery, seal the electrode assembly and electrolyte in the case, and implement an electrical connection of the electrode assembly with conductive assemblies outside the case. The top cap assembly of embodiments of the present disclosure may also improve the sealing of the secondary battery while simplifying the structure of the top cap assembly and the assembling procedure, thereby reducing the production cost of the secondary battery and improving the use reliability of the secondary battery.

To better understand the present disclosure, the top cap assembly of a secondary battery according to embodiments of the present disclosure will be described in detail below with reference to FIG. 1 to FIG. 14.

Figure 2:
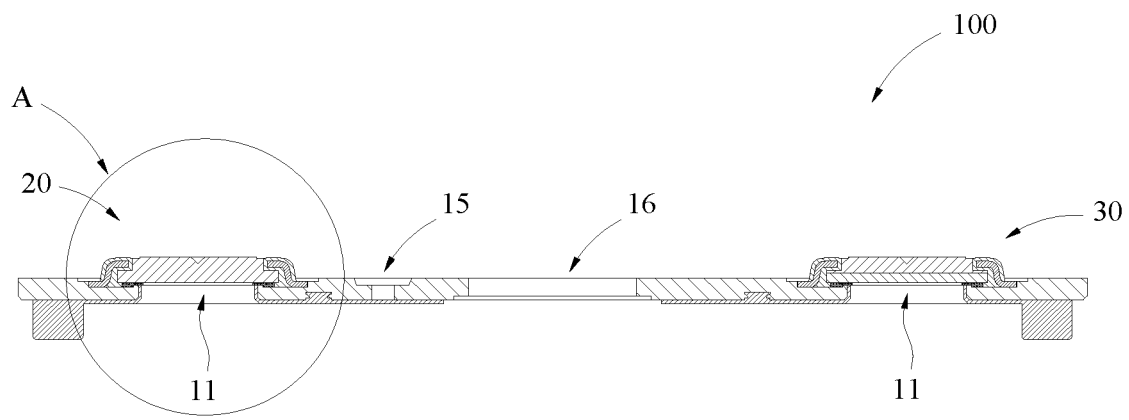
FIG. 2 is a cross-section structure diagram of the top cap assembly of FIG. 1 along the longitudinal direction.

FIG. 1 is a stereoscopic structure diagram of atop cap assembly 100 of a secondary battery according to an embodiment of the present disclosure; and FIG. 2 is a cross-section structure diagram of the top cap assembly 100 of FIG. 1 along the longitudinal direction. It should be noted that the structure diagram of a complete secondary battery according to embodiments of the present disclosure is not shown in the drawings, and the secondary battery may generally comprise: a top cap assembly 100, a case, and an electrode assembly inside the case. Note that in the following description of embodiments, "top", "bottom", "upper", and "lower" are all the directions shown with reference to the placement position of the secondary battery in the drawings.

According to one embodiment of the present disclosure, the case may be made of a metal material such as aluminum, aluminum alloy or steel. The case may be formed as a rectangular box with an opening through which to connect accommodation spaces inside the case.

The electrode assembly may be formed by stacking or winding together a first electrode plate, a second electrode plate, and a separator, wherein the separator may be an insulator arranged between the first electrode plate and the second electrode plate. In the present embodiment, the first electrode plate may be exemplified as a positive electrode plate while the second electrode plate may be exemplified as a negative electrode plate. Likewise, in other embodiments, the first electrode plate may also be the negative electrode plate while the second electrode plate being the positive electrode plate. In addition, positive electrode active materials may be coated on a coated region of the positive electrode plate, while negative electrode active materials may be coated on a coated region of the negative electrode plate. A portion extending from the coated region of the first electrode plate may serve as a tab, i.e., a first tab; while a portion extending from the coated region of the second electrode plate may also serve as a tab, i.e., a second tab.

As shown in FIG. 1 and FIG. 2, the top cap assembly 100 may be used to seal the case, and the opening connected to the case through the top cap assembly 100 may seal the electrode assembly inside the case. According to an embodiment of the present disclosure, the top cap assembly 100 may generally comprise a top cap plate 10, a terminal assembly 20, a terminal assembly 30, and a lower insulation component 40.

The top cap plate 10 may be formed as a thin plate with a size and shape matching the opening of the case, so as to be connectable at the opening of the case. The top cap plate 10 may be made of metal materials, for example, the same metal material as the material of the case may be selected. In this embodiment, the top cap plate 10 may be provided with an electrode extraction hole 11, a first sink portion 12, a second sink portion 13, a third sink portion 14, an injection hole 15, and an vent assembly 16.

The injection hole 15 may be formed according to a predetermined size on the top cap plate 10, so that after the top cap plate 10 covers the opening of the case and is hermetically connected to the case, it is possible to inject electrolyte into the accommodation space of the case through the injection hole 15.

The vent assembly 16 may utilize existing structures (for example, be provided with an explosion-proof sheet), and the vent assembly 16 may be arranged at a substantially central position of the top cap plate 10.

If the internal pressure of the secondary battery is too high, the explosion-proof sheet in the vent assembly 16 may break so that gas formed inside the secondary battery may be discharged to the outside through the through-hole of the vent assembly 16, thereby to prevent the secondary battery from exploding.

Figure 3:
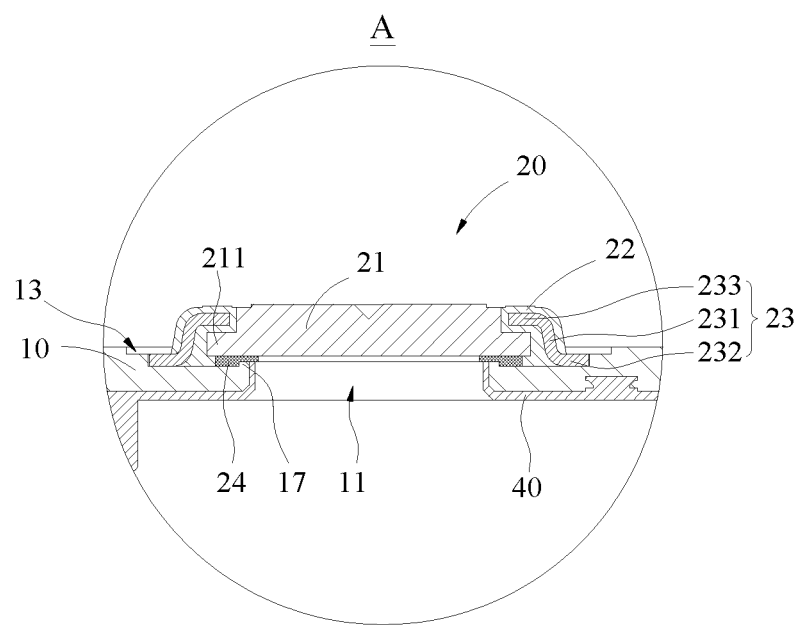
FIG. 3 is a local enlarged structure diagram of portion A in the top cap assembly of FIG. 2.
Figure 4:
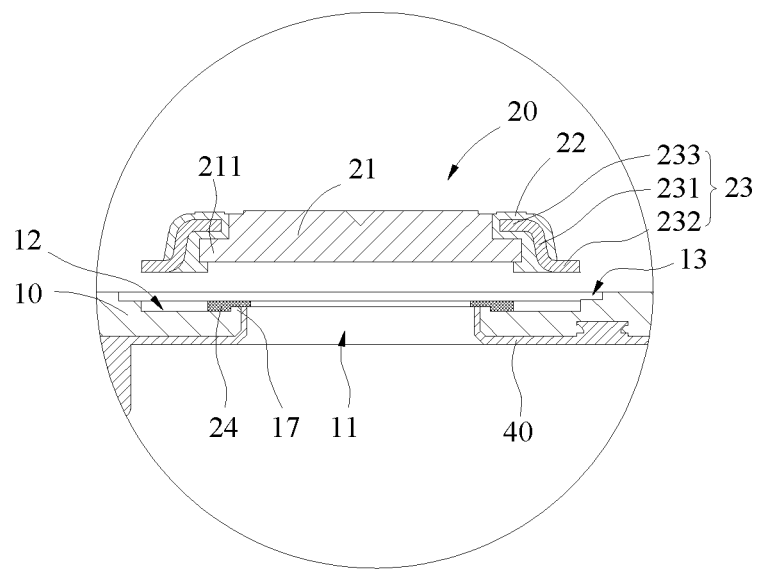
FIG. 4 is a stereoscopic diagram of the local enlarged structure diagram of portion A of FIG. 3.

FIG. 3 is a local enlarged structure diagram of portion A in the top cap assembly 100 of FIG. 2; and FIG. 4 is a stereoscopic diagram of the local enlarged structure diagram of portion A of FIG. 3. As shown in FIG. 1 to FIG. 4, according to an exemplary embodiment of the present disclosure, the top cap plate 10 may be provided with two electrode extraction holes 11 (one corresponding to the positive electrode and the other to the negative electrode) for extracting the electric energy in the electrode assembly inside the case out of the top cap plate 10. In one exemplary embodiment, the terminal assembly 20 may generally comprise: an electrode terminal, a first fixing component 22, a second fixing component 23 and a seal component 24; similarly, the terminal assembly 30 may generally comprise: an electrode terminal, a first fixing component 32, a second fixing component 33 and a seal component 34. In the following, only the structure of the terminal assembly 20 and its mounting form on the top cap plate 10 will be taken as an example for illustration. Also, for example, in the following description, the terminal assembly in which the terminal assembly 20 is a positive electrode and the terminal assembly 30 is a negative electrode will be described.

In addition, to maintain an insulation state between the top cap plate 10 and the electrode assembly inside the case, the lower insulation component 40 may generally be made of a plastic material and have a substantially plate shape, and may be attached to the surface of a side of the top cap plate 10 facing inner of the case, such that the top cap plate 10 may be kept insulated from the electrode assembly inside the case. The lower insulation component 40 may comprise two through-holes and a first insulation component arranged around the through-holes, and the two through-holes maybe opposite to the two electrode extraction holes 11 arranged on the top cap plate 10, respectively, while the first insulation component may be respectively arranged around the perimeter of the through-holes.

The electrode terminal in the terminal assembly 20 may comprise a terminal plate 21, in the present embodiment, the terminal plate 21 may be, for example, a circular (or, of course, square) sheet or plate, and the outer peripheral surface of the terminal plate 21 may be at least partially surrounded by the first fixing component 22, so that the terminal plate 21 may be fixed to the first fixing component 22. It should be noted that the fixing herein refers to a fixing in thickness direction, since the top cap plate 10 is fixed under the terminal plate 21, it may be sufficient for the fixing to prevent the terminal plate 21 from disconnecting above the top cap plate 10. In an alternative embodiment, the electrode terminal may be a plate-like structure, and the surface of the electrode terminal near the top cap plate 10 may not exceed the surface of the top cap plate 10 near the electrode terminal (i.e., the electrode terminal may be composed of the terminal plate 21, and the electrode terminal may not protrude into the electrode extraction hole 11).

The first fixing component 22 may be a plastic component and combined to the outer peripheral surface of the terminal board 21 by integral injection molding. In an exemplary embodiment, the first fixing component 22 may be a rigid plastic component, for example, the first fixing component 22 may be made of a high-temperature resistant insulating plastic material by integral injection molding, such as one of more of polyphenylene sulfide, perfluoroalkoxy resin, and polypropylene. In addition, it may also be possible to add conductive materials (for example, conductive carbon, etc., to charge the case to prevent the case from being corroded by the electrolyte) in the insulating plastic material for the first fixing component 22, and to ensure that the positive electrode and the negative electrode will not be short-circuited, the first fixing component 32 of the terminal assembly 30 must be insulated from the top cap plate 10.

In the present embodiment, for example, the first fixing component 22 may be a revolving body structure and have a accommodation space adapted to the shape of the terminal plate 21, so that the terminal plate 21 may be accommodated in the accommodation space, and the first fixing component 22 may be attached firmly to the terminal plate 21, then a portion of the first fixing component 22 may be arranged between the terminal plate 21 and the top cap plate 10.

To make the connection between the terminal plate 21 and the first fixing component 22 more stable, a convex portion and a concave portion may be arranged correspondingly between the terminal plate 21 and the first fixing component 22, and the fixing between the terminal plate 21 and the first fixing component 22 may be implemented through the mutual clamping of the convex portion and the concave portion. For example, in the present embodiment, the terminal plate 21 may be provided with a convex portion, and the first fixing component 22 may be provided with a concave portion corresponding to the convex portion, specifically, the convex portion may be the first flange 211 protrudes from the outer peripheral surface of the terminal plate 21, and the first flange 211 may be annular as a whole; correspondingly, the concave portion may be an accommodation groove arranged circumferentially on the inner wall of the through-hole 221 of the first fixing component 22, thus the accommodation groove may also be annular as a whole. When assembling the first fixing component 22 on the outer perimeter of the terminal plate 21, the first flange 211 of the terminal plate 21 may be inserted into the accommodation groove of the first fixing component 22, i.e. a portion of the first fixing component 22 may be located on a side of the first flange 211 away from the top cap plate 10 and abut against the first flange 211, so as to achieve a mutual fixing of the terminal plate 21 and the first fixing component 22.

Of course, according to an exemplary embodiment of the present disclosure, the convex portion may be continuously or discontinuously arranged on the outer peripheral surface of the terminal plate 21; correspondingly, the concave portion may also be continuously or discontinuously arranged on the inner wall of the through-hole 221. In addition, in other alternative embodiments, it is also possible to provide a concave portion on the outer peripheral surface of the terminal plate 21, and correspondingly, provide a convex portion matching the concave portion on the inner wall of the through-hole 221 of the first fixing component 22, so as to implement a fixing between the terminal plate 21 and the first fixing component 22 through a mutual clamping of the convex portion and the concave portion.

In this manner, the first fixing component 22 may be able to wrap the surface of a side of the terminal plate 21 away from the top cap plate 10, so that the first fixing component 22 may be fixedly connected to the terminal plate 21 more firmly, while after the terminal plate 21 and the first fixing component 22 are fixedly connected to each other and fixed on the top cap plate 10, the overall thickness of the top cap assembly 100 will not increase, thereby the space occupied by the secondary batteries along the height direction may be saved to improve the energy density of the secondary battery.

According to an embodiment of the present disclosure, the second fixing component 23 may surround the outer perimeter of the terminal plate 21 and fixedly connect to the first fixing component 22, thereby fixing the terminal plate 21 and the first fixing component 22 onto the top cap plate 10. In addition, to improve the stability of the connection, preferably, the second fixing component 23 may utilize metal materials. According to an exemplary embodiment of the present disclosure, the second fixing component 23 may be a revolving body structure comprising a main body which may also be revolving body structure and a first connection portion 232, so that the main body may connect to the first fixing component 22, while connect to the top cap plate 10 via the first connection portion 232.

For example, the main body may comprise a transition portion 231 and a second connection portion 233, and the transition portion 231 may be connected between the first connection portion 232 and the second connection portion 233. The first connection portion 232 and the second connection portion 233 may be connected to two ends of the transition portion 231, respectively, and the first connection portion 232 and the second connection portion 233 may extend toward opposite directions, respectively, so that the cross section of the second fixing component 23 along the longitudinal direction may be formed substantially as a Z shape.

Specifically, according to an exemplary embodiment of the present disclosure, to fix the terminal plate 21 and the first fixing component 22 onto the top cap plate 10, both the transition portion 231 and the second connection portion 233 may be fixedly connected to the first fixing component 22 (for example, the transition portion 231 and the second connection portion 233 may be fixedly connected by being embedded into the first fixing component 22), while the first connection portion 232 may be fixedly connected to the top cap plate 10 (for example, the first connection portion 232 may be fixedly connected to the top cap plate 10 by welding). Specifically, in the present embodiment, the first fixing component 22 may be provided with a accommodation groove circumferentially which may be annular and the opening thereof may be formed at a position near the bottom of the outer peripheral surface of the first fixing component 22, and the cross section of the accommodation groove along the longitudinal direction may substantially present a Z shape, that is, the shape of the accommodation groove may match the shape of the transition portion 231 and the second connection portion 233. Of course, in some alternative embodiments, the accommodation groove of the first fixing component 22 may also only match the shape of the second connection portion 233, so as to after the second fixing component 23 is fixedly connected to the first fixing component 22, the second connection portion 233 of the second fixing component 23 may be embedded into the first fixing component 22, while and the transition portion 231 may be exposed outside the first fixing component 22.

Specifically, according to an exemplary embodiment of the present disclosure, the first connection portion 232 may extend away from the terminal plate 21, while the second connection portion 233 may extend toward the terminal plate 21. The second connection portion 233 may be located on a side of the first flange 211 of the terminal plate 21 away from the top cap plate 10, and a portion of the first fixing component 22 may be located between the terminal plate 21 and the second fixing component 23 to separate the terminal plate 21 and the second fixing component 23, as so to avoid a contact between the terminal plate 21 and the second fixing component 23 after the terminal assembly 20 is mounted on the top cap plate 10 (if the positive terminal plate contacts the second fixing component corresponding to the positive side and the negative terminal plate contacts the second fixing component corresponding to the negative side, a short circuit problem of the secondary battery may arise due to both the second fixing components corresponding to the positive side and the negative side are welded onto the top cap plate). Therefore, the second connection portion 233 may abut against the first flange 211 of the terminal plate 21 indirectly through the first fixing component 22, in turn the terminal plate 21 and the first fixing component 22 may be pressed onto the top cap plate 10 firmly.

According to an exemplary embodiment of the present disclosure, to connect to the terminal assembly 20, the top cap plate 10 may be provided with a first sink portion 12 and a second sink portion 13. The first sink portion 12 may surround the perimeter of the electrode extraction hole 11, and to accommodate the first fixing component 22 and the second fixing component 23, the first sink portion 12 may be annular as a whole. The second sink portion 13 may surround the perimeter of the first sink portion 12, and the depth of the second sink portion 13 may be less than that of the first sink portion 12, so that the first sink portion 12 and the second sink portion 13 may form a step structure.

For example, for ease of mounting, the bottom surface of the first connection component 232 exposed outwardly from the accommodation groove of the first fixing component 22 (i.e., the surface facing the top cap plate 10) may be flush with the bottom surface of the first fixing component 22. Thereby, the first fixing component 22 and the second fixing component 23 may be simultaneously placed in the first sink portion 12, and the bottom surfaces of the first fixing component 22 and the first connection portion 232 (i.e., the surface of a side of the first fixing component 22 and the first connection portion 232 facing the top cap plate 10) may be attached to the bottom surface of the first sink portion 12, while the top surface of the first connection portion 232 (i.e., the surface of the first connection portion 232 away from the top cap plate 10) may be flush with the bottom surface of the second sink portion 13, so that the outer peripheral surface of the first connection portion 232 and the wall of the first sink portion 12 may be attached, or a small gap may be formed between them. Therefore, the first connection portion 232 and the wall of the first sink portion 12 may be welded together. It should be noted that the gap formed between the first connection portion 232 and the wall of the first sink portion 12 cannot affect the welding between the first connection portion 232 and the top cap plate 10.

Thus, after the terminal assembly 20 is fixed onto the top cap plate 10, at least part of the first fixing component 22 and the first connection portion 232 along the thickness direction may be accommodated in the first sink portion 12, and the first connection portion 232 may be entirely accommodated in the first sink portion 12 along the thickness direction. Therefore, the overall height of the secondary battery may be reduced to improve its energy density. In addition, after the first connection portion 232 is welded to the top cap plate 10, a portion of the first fixing component 22 may be located between the second connection portion 233 and the top cap plate 10. Therefore, the second fixing component 23 may be able to apply a pressure to the first flange 211 and the first fixing component 22 through the second connection portion 233, in turn the terminal plate 21 and the first fixing component 22 may be pressed onto the top cap plate 10 firmly to prevent the terminal plate 21 from disconnecting with the first fixing component 22.

In addition, since the first connection portion 232 is welded to the top cap plate 10 circumferentially, a uniform pressing force may be provided to the terminal plate 21 circumferentially, so that not only to ensure a stable connection between the first connection portion 232 and the top cap plate 10 to connect the terminal assembly 20 and the top cap plate 10 more firmly, but also to simply the connection operation of the electrode terminal. It should be avoided to fix the electrode terminal onto the top cap plate 10 by a riveting structure or other fixing structures, during a long period of use, the electrode terminal may come off if the riveting structure or other fixing structures loose, which may cause secondary battery leakage issues or effect the power transmission of the secondary battery. Therefore, in the top cap assembly 100 of embodiments of the present disclosure, the second fixing component 23 may be used to fix the terminal plate 21 and the first fixing component 22 onto the top cap plate, thus the stability of the connection between the terminal assembly 20 and the top cap plate 10 may be improved to increase the working life of secondary batteries and reduce production costs.

In addition, in embodiments of the present disclosure, the connection manners between the terminal plate 21, the first fixing component 22, and the second fixing component 23 are not limited, for example, the first fixing component 22 may utilize plastic materials, while the terminal plate 21, the second fixing component 23 and the top cap plate 10 may utilize metal materials, and the terminal plate 21 as well as the second fixing component 23 may be fixedly connected together by integral injection molding (the injected plastic part may form the first fixing component 22) to enable the terminal assembly 20 to be fixed onto the top cap plate 10 as a whole, so that the stability of the connection between the terminal assembly 20 and the top cap plate 10 may be improved. Moreover, the second fixing component 23 and the top cap plate 10 may be fixed by welding to enhance the engaging strength and engaging reliability.

Proceed to refer to FIG. 1 to FIG. 4, to seal the electrode extraction hole 11, the seal component 24 may be arranged between the terminal plate 21 and the top cap plate 10, and surround the electrode extraction hole 11. In the present embodiment, specifically, the seal component 24 may be annular and provided with a annular groove on its surface facing the top cap plate 10, while an annular third flange 17 may be provided surrounding the electrode extraction hole 11 on a side of the top cap plate 10 facing the seal component 24, the third flange 17 may extend toward the terminal plate 21, the seal component 24 may be assembled on the third flange 17 so that the third flange 17 may be accommodated in the groove of the seal component 24 to position the seal component 24 via the third flange 17 and prevent the seal component 24 from moving. In addition, after the terminal assembly 20 is assembled on the top cap plate 10, under the pressing force of the second fixing component 23, the terminal plate 21 may press the seal component 24 toward the top cap plate 10, thus the seal component 24 between the third flange 17 and the terminal plate 21 may be compressed, so that the seal component 24 may form a seal line between the terminal plate 21 and the top cap plate 10. In this manner, the sealing between the terminal plate 21 and the top cap plate 10 may be enhanced, which may avoid leakage issues resulting from a loose sealing between the terminal plate 21 and the top cap plate 10, and further improve the use reliability of the secondary battery.

In addition, because both the terminal plate 21 and the first fixing component 22 in the terminal assembly 20 may be fixed onto the top cap 10 by being assembled from the top to the bottom, and the first connection portion 232 of the second fixing component 23 may be welded to the top cap 10, the second connection portion 233 may be used to provide an effective pressing force for the seal component 24 indirectly to enhance the sealing of the electrode extraction hole 11, while by arranging the seal component 24 outside of the case, the occupation of the internal space of the case of the secondary battery may be reduced to improve energy density of the secondary battery, moreover, the probability that the seal component 24 being swelling due to a contact with the electrolyte inside the case may be reduced to ensure the use reliability of the second battery, such that a seal failure may be avoided during use.

Figure 5:
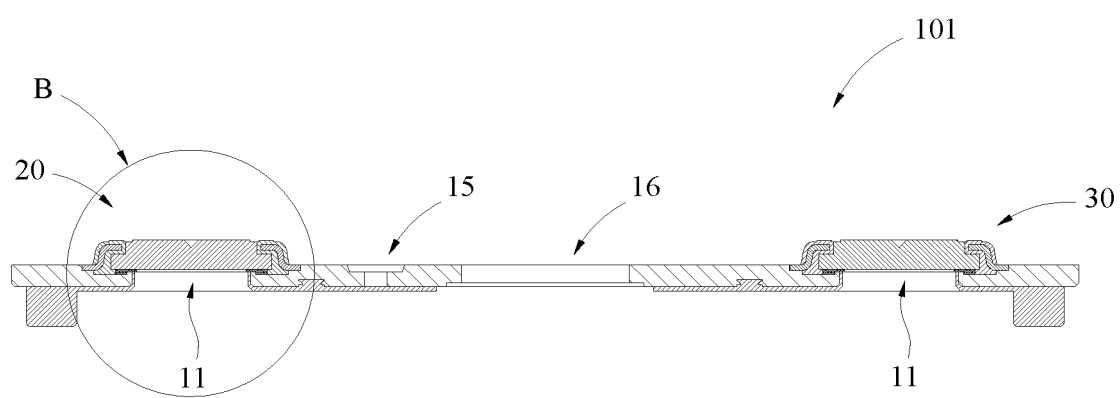
FIG. 5 is a cross-section structure diagram of the top cap assembly along the longitudinal direction according to another embodiment of the present disclosure.
Figure 6:
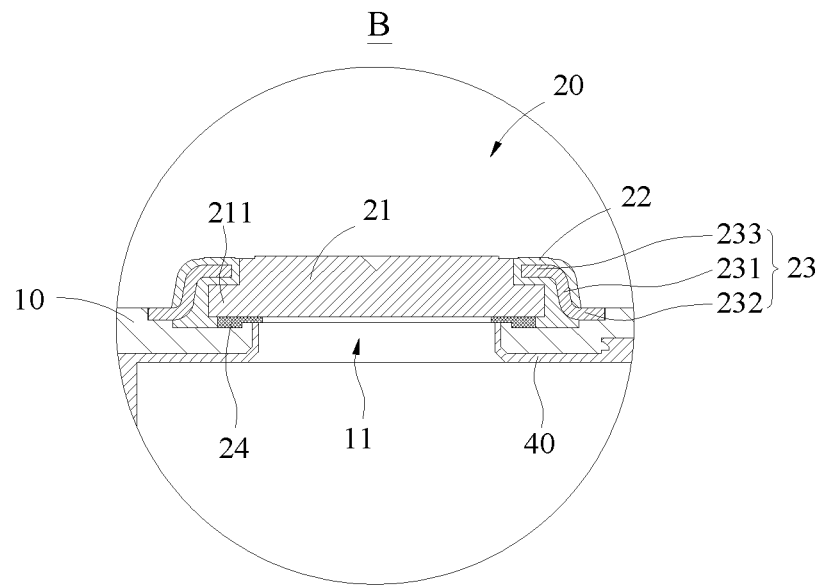
FIG. 6 is a local enlarged structure diagram of portion B in the top cap assembly of FIG. 5.
Figure 7:
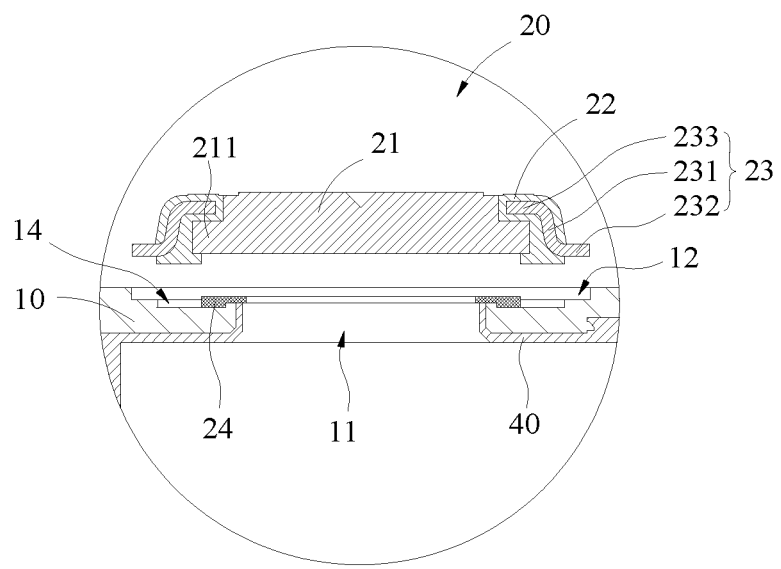
FIG. 7 is a stereoscopic diagram of the local enlarged structure diagram of portion B of FIG. 6.

FIG. 5 is a cross-section structure diagram of the top cap assembly 101 along the longitudinal direction according to another embodiment of the present disclosure; FIG. 6 is a local enlarged structure diagram of portion B in the top cap assembly 101 of FIG. 5; and FIG. 7 is a stereoscopic diagram of the local enlarged structure diagram of portion B of FIG. 6. In the present embodiment, for ease of understanding, the same components as those in the top cap assembly 100 in the above embodiments may use the same reference numerals, and descriptions for the components that have been illustrated will be omitted. As shown in FIG. 5 to FIG. 7, the top cap assembly 101 in the present embodiment may be different from the top cap assembly 100 in the above embodiments in that the bottom surface of the first connection portion 232 protrudes via the accommodation groove of the first fixing component 22 may not be flush with the first fixing component 22, and the bottom surface of the first connection portion 232 may be higher than the bottom surface of the first fixing component 22 (i.e., the bottom surface of the first connection portion 232 may be further from the top cap plate 10 than the bottom surface of the first fixing component 22). To fix the terminal assembly 20, the top cap plate 10 may be provided with a first sink portion 12 and a third sink portion 14.

Specifically, in the present embodiment, the first sink portion 12 and the second sink portion 14 may simultaneously surround the outside of the electrode extraction hole 11, and the third sink portion 14 may be located inside the first sink portion 12 and the depth of the third sink portion 14 may be greater than that of the first sink portion 12. Of course, corresponding to the first fixing component 22 and the second fixing component 23 in the above embodiments, both the first sink portion 12 and the second sink portion 14 may be annular. After the terminal assembly 20 is fixed onto the top cap plate 10, the first fixing component 22 may be accommodated in the third sink portion 14 circumferentially, and the first fixing component 22 may be attached to the bottom surface of the third sink portion 14; while the first connection portion 232 may be accommodated in the first sink portion 12 circumferentially, and the top surface of the first connection portion 232 (i.e., the surface of a side of the first connection portion 232 away from the top cap plate 10) may be flush with the top surface of the top cap plate 10, and the outer peripheral surface of the first connection portion 232 and the wall of the first sink portion 12 may be attached, or a small gap may be formed between them. Therefore, the first connection portion 232 and the wall of the first sink portion 12 may also be welded together.

In this manner, after the terminal plate 21 and the first fixing component 22 are fixed onto the top cap plate 10 via the second fixing component 23, it may be possible to prevent the terminal assembly 20 from occupying too much height space, to improve the energy density of the secondary battery, as well as the stability of the connection of the terminal assembly 20.

Figure 8:
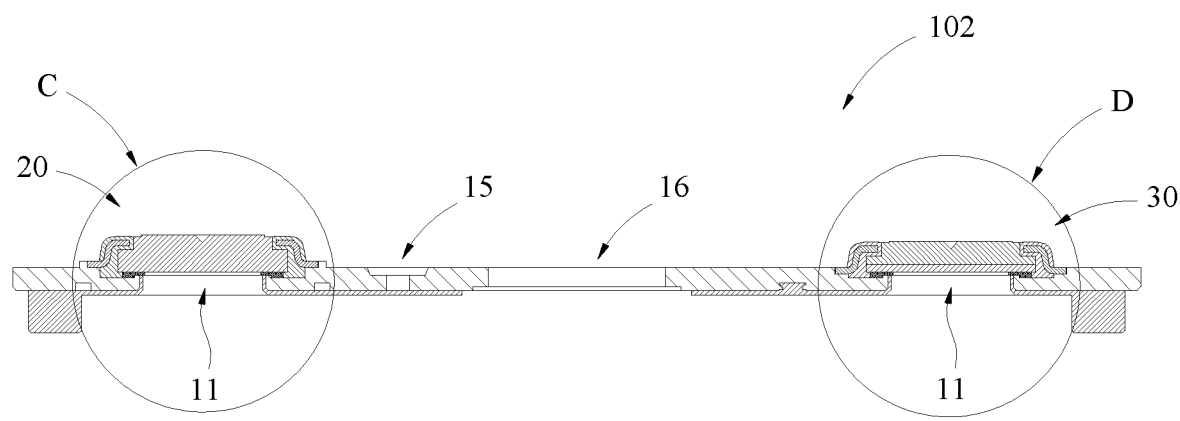
FIG. 8 is a cross-section structure diagram of the top cap assembly along the longitudinal direction according to yet another embodiment of the present disclosure.
Figure 9:
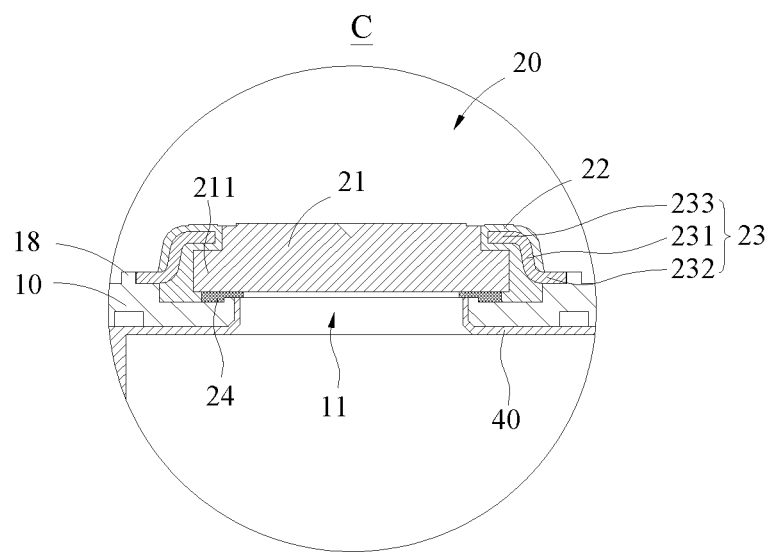
FIG. 9 is a local enlarged structure diagram of portion C in the top cap assembly of FIG. 8.
Figure 10:
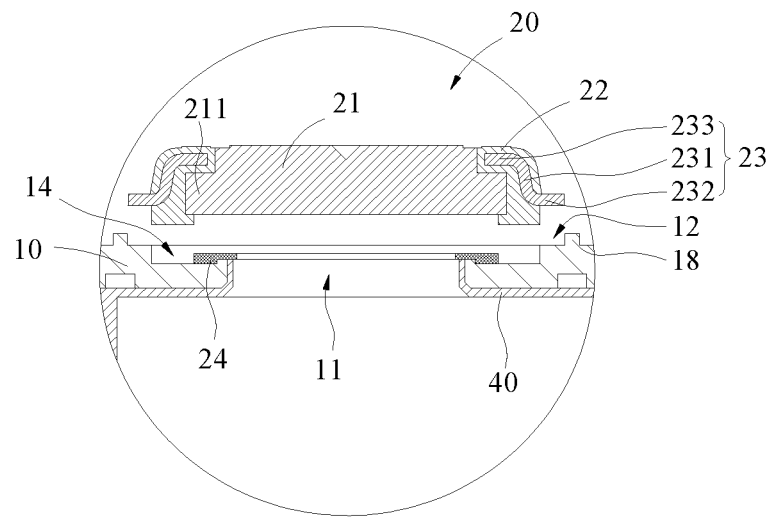
FIG. 10 is a stereoscopic diagram of the local enlarged structure diagram of portion C of FIG. 9.

FIG. 8 is a cross-section structure diagram of the top cap assembly 102 along the longitudinal direction according to yet another embodiment of the present disclosure; FIG. 9 is a local enlarged structure diagram of portion C in the top cap assembly 102 of FIG. 8; and FIG. 10 is a stereoscopic diagram of the local enlarged structure diagram of portion C of FIG. 9. In the present embodiment, for ease of understanding, the same components as those in the top cap assembly 101 in the above embodiments may use the same reference numerals, and descriptions for the components that have been illustrated will be omitted. As shown in FIG. 8 to FIG. 10, the top cap assembly 102 in the present embodiment may be different from the top cap assembly 101 in the above embodiments in the arrangement manner of the first sink portion 12.

In the above embodiment, the first sink portion 12 may be provided by notching the upper surface of the top cap plate 10, but embodiments of the present disclosure are not limited thereto. According to an exemplary embodiment of the present disclosure, as shown in FIG. 8 to FIG. 10, the top cap plate 10 may also be provided with a first sink portion 12 and a third sink portion 14, and the third sink portion 14 may be located inside of the first sink position 12. The third sink portion 14 may surround the perimeter of the electrode extraction hole 11, and the top cap plate 10 may further comprise a fourth flange 18 which may surround the perimeter of the third sink portion 14 and be annular, thus the first sink portion 12 may be formed around the outside of the third sink portion 14 through the annular fourth flange 18.

In the present embodiment, like the top cap assembly 101 in the above embodiment, the bottom surface of the first connection portion 232 may be not flush with the bottom surface of the first fixing component 22. Therefore, after the terminal assembly 20 is fixed onto the top cap plate 10, the first fixing component 22 may be accommodated in the third sink portion 14 circumferentially, and the bottom surface of the first fixing component 22 and the bottom surface of the third sink portion 14 may be attached; the first connection portion 232 may be accommodated in the first sink portion 12 circumferentially, and the bottom surface of the first connection portion 232 and the bottom surface of the first sink portion 12 may be attached.

Therefore, in the present embodiment, it may be necessary to weld the first connection portion 232 with the wall of the first sink portion 12 (i.e., the inner wall of the fourth flange 18) circumferentially, so that the second fixing component 23 may also be used to fix the terminal plate 21 and the first fixing component 22 onto the top cap plate 10.

According to an alternative embodiment of the present disclosure, a groove may be formed on a side of the top cap plate 10 away from the terminal plate 21 by providing the fourth flange 18. In the present embodiment, the fourth flange 18 may be punched on the surface of a side of the top cap plate 10 provided with the terminal plate 21, thereby forming a concave groove on the surface of a side of the top cap plate 10 facing the inside of the case. Therefore, the groove and the formation path of the fourth flange 18 may coincide, so that the structural strength of the top cap plate 10 will not be affected. By forming the groove, it may also be possible to store the gas generated during the use of the secondary battery (i.e., the inside of the case may accommodate more gas), so that the force of the generated gas on the explosion-proof sheet in the vent assembly 16 may be reduced to increase the working life of the explosion-proof sheet.

Figure 11:
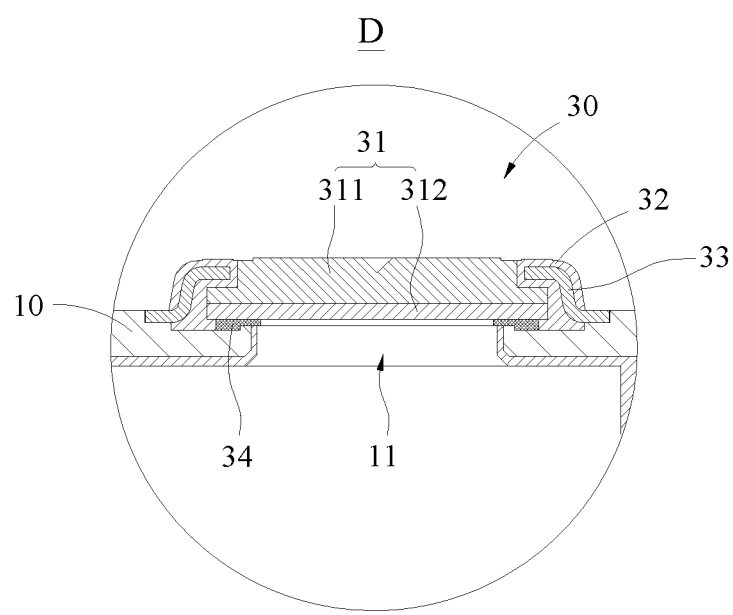
FIG. 11 is a local enlarged structure diagram of portion D in the top cap assembly of FIG. 8.

FIG. 11 is a local enlarged structure diagram of portion D in the top cap assembly 102 of FIG. 8. As shown in FIG. 8 and FIG. 11, according to an alternative embodiment of the present disclosure, the terminal plate 31 in the top cap assembly 102 may be a composite plate tape structure.

Specifically, the terminal plate 31 may comprise a first terminal plate 311 and a second terminal plate 312. To realize a cascade of secondary batteries, it may be necessary to laser weld the terminal plate 21 of one secondary battery and the terminal plate 31 of another secondary battery with the same bus-bar, respectively, and preferably, the portion of the terminal plate 21 and the terminal plate 31 connected to the bus-bar may have the same material of base metal with the bus-bar.

For example, if the material of the bus-bar is aluminum, since the base metal of the terminal plate 21 itself may be aluminum, the terminal plate 21 may be directly welded to the bus-bar. However, for the terminal plate 31 connected to the negative electrode plate, a copper-aluminum conversion may be required. Since the first terminal plate 311 may be further away from the top cap plate 10 than the second terminal plate 312, the first terminal plate 311 connected to the bus-bar may use aluminum as the base metal, while the second terminal plate 312 connected to the negative electrode plate may use copper as the base metal. Since the first terminal plate 311 may use aluminum as the base metal while the second terminal plate 312 may use copper as the base metal, that is, the oxidation-reduction potential of the second terminal plate 312 may be higher than that of the first terminal plate 311 (there may exist an oxidation-reduction potential difference), if the electrolyte contacts the first terminal plate 311, corrosions may occur at the connection interface of the first terminal plate 311 and the second terminal plate 312.

However, in the present embodiment, the seal component 34 may be arranged between the second terminal plate 312 and the top cap plate 10 and contact with the second terminal plate 312 and the top cap plate 10 closely, respectively, so as to avoid a contact of the first terminal plate 311 with the electrolyte inside the case, which may avoid the corrosions at the connection interface of the first terminal plate 311 and the second terminal plate 312. Therefore, the assembling of the top cap assembly 102 of the present embodiment is simple and the structural stability is high.

In addition, the seal component 34 used to seal the electrode extraction hole 11 may surround the electrode extraction hole 11 and be attached between the second terminal plate 312 and the top cap plate 10, for two terminal plates comprising different base metals, compared with the existing top cap assembly, since the seal component 34 does not support the two terminal plates, there is no mutual pulling force between the two terminal plates, thus it may be avoided for the connection interface of the first terminal plate 311 and the second terminal 312 to be in a tensile stress state for a long period of time to reduce the risk of breakage of the terminal plate 31, so as to ensure the use reliability of the secondary battery.

Figure 12:
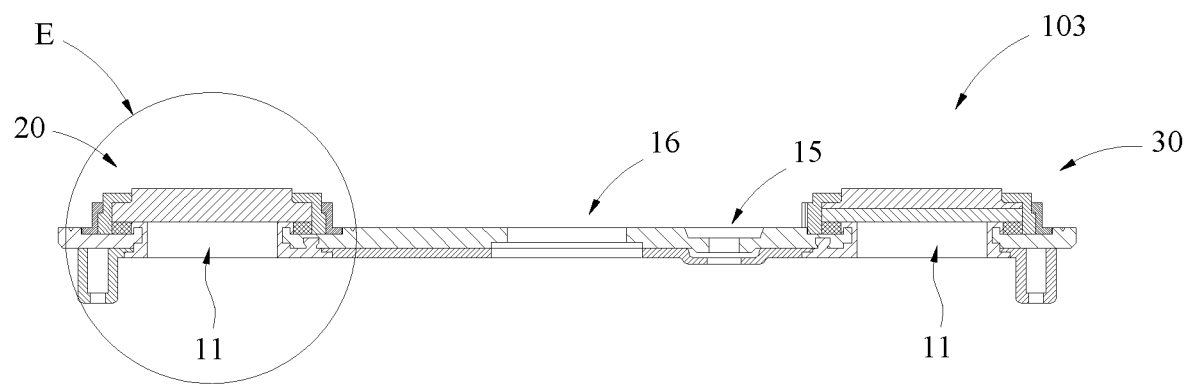
FIG. 12 is a cross-section structure diagram of the top cap assembly along the longitudinal direction according to yet another embodiment of the present disclosure.
Figure 13:
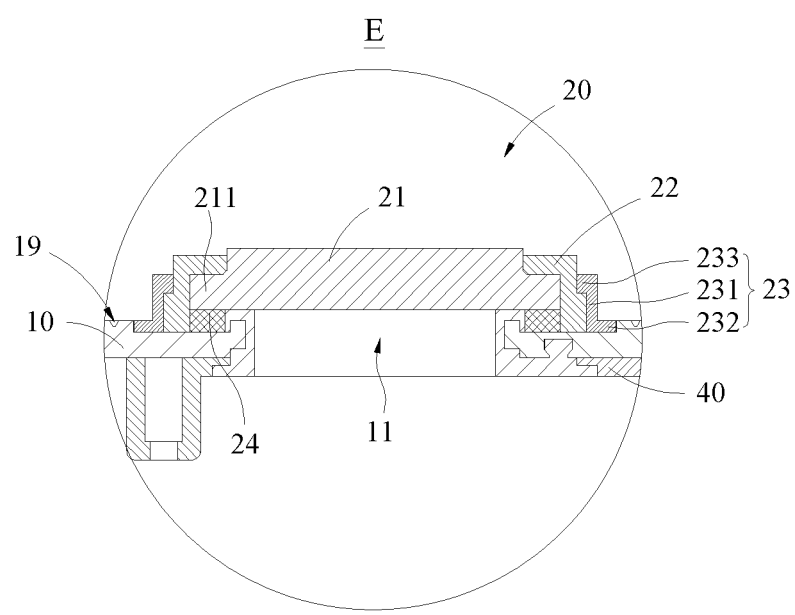
FIG. 13 is a local enlarged structure diagram of portion E in the top cap assembly of FIG. 12.

FIG. 12 is a cross-section structure diagram of the top cap assembly 103 along the longitudinal direction according to yet another embodiment of the present disclosure; and FIG. 13 is a local enlarged structure diagram of portion E in the top cap assembly 103 of FIG. 12. In the present embodiment, for ease of understanding, the same components as those in the top cap assembly 101 in the above embodiments may use the same reference numerals, and descriptions for the components that have been illustrated will be omitted. As shown in FIG. 12 and FIG. 13, the top cap assembly 103 in the present embodiment may be different from the top cap assembly 101 in the above embodiments in the engaging manner of the first fixing component 22 and the second fixing component 23.

According to an exemplary embodiment of the present disclosure, the second fixing component 23 may fix the first fixing component 22 and the terminal plate 21 onto the top cap plate 10 by means of clamping. Specifically, in the present embodiment, the first fixing component 22 may also be a revolving body structure, and the first fixing component 22 may also be provided with a second flange 222 which may surround the outer perimeter of the first fixing component 22 circumferentially and extend away from the first fixing component 22. Of course, in the present embodiment, the second flange 222 may be a continuous annular structure.

In the present embodiment, the second fixing component 23 may also comprise a transition portion 231, a first connection portion 232, and a second connection portion 233, and the transition portion 231 may be connected between the first connection portion 232 and the second connection portion 233. Preferably, the second fixing component 23 may be configured as a continuous annular structure, and the second fixing component 23 may also be fixed with the top cap plate through the first connection portion 232, while with the first fixing component 22 through the second connection portion 233. For example, to clamp with the first fixing component 22, the second connection portion 233 of the second fixing component 23 may extend substantially in parallel to the top cap plate 10.

For example, if it is required to mount the terminal assembly 20 onto the top cap plate 10, the terminal plate 21 and the first fixing component 22 may be fixed to each other and then arranged onto the top cap plate 10 and cover the electrode extraction hole 11, then the second fixing component 23 may be assembled outside the first fixing component 22 from the top to the bottom, to enable the second connection portion 233 of the second fixing component 23 to abut against the second flange 222 provided on the first fixing component 22. After the first connection portion 232 is welded to the top cap plate 10, the first fixing component 22 and the terminal plate 21 may be pressed down through the second connection portion 233 so that the terminal plate 21 may be firmly fixed onto the top cap plate 10, so as to prevent the terminal plate 21 and the first fixing component 22 from disconnecting with the top cap plate 10. Therefore, the stability of the structure of the top cap assembly 103 may be improved to avoid gaps between the first fixing component 22 as well as the terminal plate 21 and the top cap plate 10 during use, which may cause leakage or other safety problems. In addition, the assembling of the top cap assembly 103 in the present embodiment is simple, thus the production cost of the secondary battery may be reduced and the assembling efficiency thereof may be improved.

According to an alternative embodiment of the present disclosure, to improve the stability of the connection between the second fixing component 23 and the top cap plate 10, an annular groove 19 may be further provided on the top cap plate 10 which may surround the outer perimeter of the first sink portion 12. Since the first sink portion 12 may be provided by means of punching, after the first sink portion 12 is formed, the wall of the first sink portion 12 may generally be an inclined surface due to the influence of the punching process, it may be interpreted as the wall of the first sink portion 12 may form a certain taper angle. After the first sink section 12 is arranged on the top cap plate 10, an annular groove 19 may be arranged on the outer perimeter of the first sink section 12, thus a certain pressing force may be applied inward from the outside of the wall of the first sink portion 12 through the annular groove 19, in this way, the distance between the wall of the first sink portion 12 and the outer peripheral surface of the first connection portion 232 may be shortened. To facilitate the welding between the first connection portion 232 and the wall of the first sink portion 12, it needs to be avoided that the distance between the outer peripheral surface of the first connection portion 232 and the inner wall of the first sink portion 12 being too large, which may cause poor connection stability after the first connection portion 232 and the top cap plate 10 are welded, or even the first connection portion 232 cannot be connected to the top cap plate 10. Of course, for example, preferably, the annular groove 19 may be provided on the top cap plate 10 by means of punching.

In addition, in other alternative embodiments, the main body may also only comprise the transition portion 231. However, it should be noted that the inner wall of the transition portion 231 needs to be configured as a conical surface, and correspondingly, another conical surface matching the conical surface needs be provided on the first fixing component 22, thus after the first fixing component 22 and the second fixing component 23 are mounted onto each other, there may form an abutting cooperation between the conical surface of the second fixing component 23 and the corresponding conical surface of the first fixing component 22, so that the second fixing component 23 may also be used to press the first fixing component 22 and the terminal plate 21 firmly onto the top cap plate 10, and prevent the first fixing component 22 from disconnecting from the limitation of the second fixing component 23, or even disconnecting from the top cap plate 10.

According to a variant embodiment of the present disclosure, the second connection portion 233 and/or the first connection portion 232 in the second fixing component 23 may also be a continuous or discontinuous annular structure. For example, if the second connection portion 233 and the first connection portion 232 are discontinuous annular structures, the second fixing component 23 may comprise at least three extending sections spaced surrounding the outer perimeter of the terminal plate 21 circumferentially. That is, in other embodiments, the second fixing component 23 may further comprise a plurality of extending sections spaced surrounding the outer perimeter of the terminal plate 21 circumferentially, thus through the plurality of extending sections surrounding the outer perimeter of the terminal plate 21 and engaging with the first fixing component 22, the terminal plate 21 and the first fixing component 22 maybe fixed onto the top cap plate 10. Of course, the engaging manner of the plurality of extending sections with the first fixing component 22 may be similar to that of the second fixing component 23 with the first fixing component 22 in each of the above embodiments, and will not be described in detail. Of course, to avoid interferences with other structures on the top cap plate 10, the second fixing component 23 may also have a notch of a predetermined length for avoiding interferences.

Figure 14:
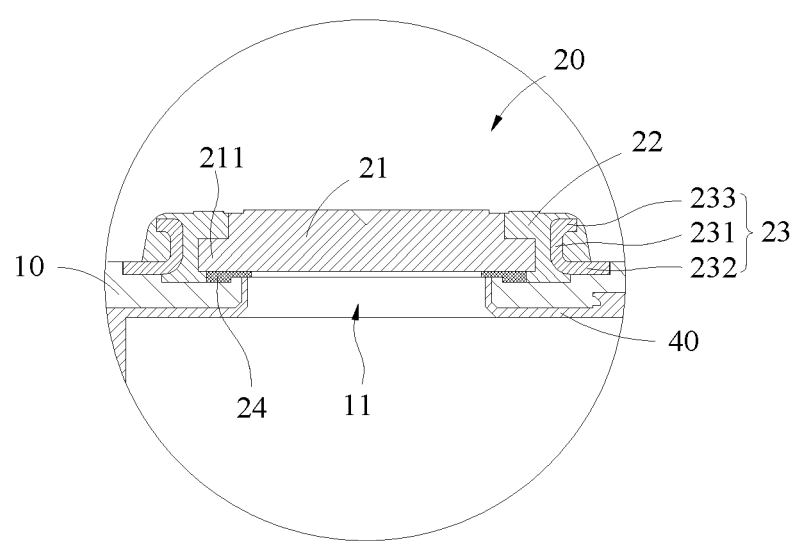
FIG. 14 is a local enlarged structure diagram of terminal assembly portion of the top cap assembly according to yet another embodiment of the present disclosure.

FIG. 14 is a local enlarged structure diagram of terminal assembly 20 portion of the top cap assembly according to yet another embodiment of the present disclosure. As shown in FIG. 14, according to a variant embodiment of the present disclosure, the second connection portion 233 of the second fixing component 23 may also extend away from the terminal plate 21, and a portion of the first fixing component 22 may be located between the second connection portion 233 and the terminal plate 21, thereby the second fixing component 23 may also be used to fix the terminal plate 21 and the first fixing component 22.

According to another embodiment of the present disclosure, there is also provided a secondary battery, comprising: a case, an electrode assembly, and a top cap assembly 100 in the above embodiments. The case may have an opening; the electrode assembly may be accommodated in the case and comprise a first electrode plate, a second electrode plate, and a separator arranged between the first electrode plate and the second electrode plate; and the top cap assembly 100 may cover the opening of the case to seal the electrode assembly in the case. Since the secondary battery may have the same advantages as the top cap assembly 100 in the above embodiments, it will not be described in detail.

The present disclosure may be implemented in other specific forms without departing from the spirit and essential characteristics thereof. Therefore, the present embodiments may be considered in all respects as illustrative and not restrictive, the scope of the present disclosure should be defined by the appended claims, rather than the foregoing description, moreover, all changes that fall into the meaning and equivalents of the claims should be contained within the scope of the present disclosure. Also, different technical features described in different embodiments may be combined to achieve beneficial effects. Those skilled in the art may understand and implement other variant embodiments of the disclosed embodiments by studying the drawings, the specification, and the claims.

What is claimed is:

1. A top cap assembly of a secondary battery, comprising:
a top cap plate having an electrode extraction hole;
an electrode terminal comprising a terminal plate, wherein the terminal plate covers the electrode extraction hole;
a first fixing component, at least partially surrounding the terminal plate to fix the electrode terminal to the first fixing component; and
a second fixing component comprising a main body and a first connection portion, wherein the first connection portion is connected to the main body and extends away from the terminal plate, the main body is fixedly connected to the first fixing component, and the first connection portion is fixedly connected to the top cap plate,
wherein the electrode terminal is separated from the second fixing component through the first fixing component, the terminal plate, the first fixing component and the second fixing component are located on a same side of the top cap plate away from inside of a case of the secondary battery.

2. The top cap assembly of claim 1, wherein the main body comprises a second connection portion and a transition portion, the transition portion is located between the first connection portion and the second connection portion, and the second connection portion is fixedly connected to the first fixing component.

3. The top cap assembly of claim 2, wherein the electrode terminal further comprises a first flange protruding from an outer peripheral surface of the terminal plate, and a portion of the first fixing component is located on a side of the first flange away from the top cap plate and abuts against the first flange.

4. The top cap assembly of claim 3, wherein the second connection portion is located on a side of the first flange away from the top cap plate.

5. The top cap assembly of claim 2, wherein the second connection portion extends toward the terminal plate, and a portion of the first fixing component is located between the second connection portion and the top cap plate.

6. The top cap assembly of claim 2, wherein the second connection portion extends away from the terminal plate, and a portion of the first fixing component is located between the second connection portion and the top cap plate.

7. The top cap assembly of claim 2, wherein the first fixing component is circumferentially provided with an accommodation groove adapted to the shape of the second connection portion, and the second connection portion protrudes into the accommodation groove and fixedly connects to the first fixing component.

8. The top cap assembly of claim 2, wherein the second connection portion extends in parallel to the top cap plate, an outer peripheral surface of the first fixing component is provided with a second flange, and the second connection portion is located on a side of the second flange away from the top cap plate and abuts against the second flange.

9. The top cap assembly of claim 2, wherein the second connection portion is a continuous annular structure; or the first connection portion is a continuous annular structure.

10. The top cap assembly of claim 1, wherein the top cap assembly further comprises a seal component arranged between the terminal plate and the top cap plate to seal the electrode extraction hole.

11. The top cap assembly of claim 10, wherein the terminal plate comprises a first terminal plate and a second terminal plate connected to the first terminal plate, the first terminal plate is located on a side of the second terminal plate away from the top cap plate, the second terminal plate covers the electrode extraction hole, the first terminal plate and the second terminal plate are made of materials having different base metals, and the seal component is located between the second terminal plate and the top cap plate.

12. The top cap assembly of claim 10, wherein the top cap plate further comprises a third flange, the third flange surrounds a perimeter of the electrode extraction hole and extends toward the terminal plate, and the seal component is assembled outside of the third flange.

13. The top cap assembly of claim 1, wherein the top cap plate further comprises a first sink portion, the first sink portion surrounds a perimeter of the electrode extraction hole, the first connection portion is at least partially accommodated in the first sink portion, and a surface of a side of the first connection portion away from the top cap plate is flush with a surface of a side of the top cap plate facing the second fixing component, and the first connection portion is welded to the top cap plate.

14. The top cap assembly of claim 13, wherein the top cap plate further comprises a second sink portion, the second sink portion surrounds a perimeter of the first sink portion, and the surface of the side of the first connection portion away from the top cap plate is flush with a bottom surface of the second sink portion.

15. The top cap assembly of claim 13, wherein the top cap plate further comprises a fourth flange, the fourth flange is annular and surrounds the perimeter of the electrode extraction hole, to form the first sink portion.

16. The top cap assembly of claim 13, wherein the top cap plate further comprises an annular groove surrounding a perimeter of the first sink portion.

17. A secondary battery, comprising:
a case having an opening;
an electrode assembly accommodated in the case; and
a top cap assembly of claim 1, wherein the top cap assembly covers the opening, to seal the electrode assembly in the case.

* * * * *